United States Patent
Denley

(10) Patent No.: US 6,315,439 B1
(45) Date of Patent: Nov. 13, 2001

(54) HEADLAMP ADJUSTOR AND METHOD

(75) Inventor: Ronald S. Denley, Woodstock, IL (US)

(73) Assignee: Elco Textron Inc., Rockford, IL (US)

( * ) Notice: Subject to any disclaimer, the term of this patent is extended or adjusted under 35 U.S.C. 154(b) by 0 days.

(21) Appl. No.: 09/573,920

(22) Filed: May 18, 2000

Related U.S. Application Data

(60) Provisional application No. 60/155,050, filed on Sep. 21, 1999.

(51) Int. Cl.[7] ............................. B60Q 1/068; F21V 14/04
(52) U.S. Cl. ...................... 362/524; 362/514; 362/289; 362/428; 362/463; 74/89.14
(58) Field of Search ................................. 362/284, 289, 362/428, 460, 463, 512, 514, 515, 524, 528, 529; 74/89.13, 89.14, 89.16, 89.17, 425

(56) References Cited

U.S. PATENT DOCUMENTS

| | | | |
|---|---|---|---|
| 4,544,313 | 10/1985 | Grossberndt | 411/411 |
| 5,285,360 | * 2/1994 | Kanner | 362/524 |
| 5,309,780 | * 5/1994 | Schmitt | 74/89.13 |
| 5,508,896 | * 4/1996 | Suehiro et al. | 362/289 |
| 5,613,754 | * 3/1997 | Dobler et al. | 362/514 |
| 5,707,133 | * 1/1998 | Burton | 362/460 |
| 5,758,943 | * 6/1998 | Shirai et al. | 362/289 |
| 5,775,794 | 7/1998 | Schmitt | 362/507 |

FOREIGN PATENT DOCUMENTS

| | | |
|---|---|---|
| WO9906715 | 11/1999 | (WO) . |
| WO9906719 | 11/1999 | (WO) . |

* cited by examiner

*Primary Examiner*—Alan Cariaso
(74) *Attorney, Agent, or Firm*—Trexler, Bushnell, Giangiorgi, Blackstone & Marr, Ltd.

(57) ABSTRACT

A headlamp adjustor which includes an adjustor output shaft that is engageable with a reflector of a headlamp assembly. The adjustor output shaft extends from a housing, and a worm gear generally in the housing is spur gearably engaged with the adjustor output shaft. Drive structure is engaged with the worm gear such that actuation of the drive structure causes at least a portion of the drive structure to thread into at least a portion of the worm gear, thereby causing the adjustor output shaft to translate relative to the housing and adjust the position of the headlamp reflector.

20 Claims, 7 Drawing Sheets

HEADLAMP ADJUSTOR AND METHOD

RELATED APPLICATION

This application claims the benefit of U.S. Provisional Application Ser. No. 60/155,050, filed Sept. 21, 1999.

BACKGROUND

The present invention relates generally to headlamp adjustors which are used to adjust the position of a reflector of a headlamp assembly, and relates more specifically to a headlamp adjustor which includes a selftapping drive screw.

The present invention also relates generally to methods for adjusting the position of a reflector of a headlamp assembly, and relates more specifically to a method for adjusting the position of a reflector of a headlamp assembly where the method includes a step of rotating a drive screw to form a thread or worm gear and effect rotation of said worm gear to attain a change in the position of the reflector.

The present invention also relates generally to methods for making headlamp adjustors, and relates more specifically to a method for making a headlamp adjustor where the method includes a step of threading a worm gear using the initial engagement of the drive screw to form a mating thread on the worm gear that allows for operation thereof, and thereafter applying a retaining member to the drive screw.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic.

A typical modern day headlamp assembly 12 is illustrated in a plan view seen as FIG. 1, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 26, and a second pivot point 30 is disposed generally horizontal of the fixed pivot 26. As such, the movable reflector 24 may be pivoted about the fixed pivot 26 in the vertical and horizontal planes to aim the headlamp beam. Adjustment mechanisms, or headlamp adjustors, 40 and 42 are typically provided at the first and second pivot points, 28 and 30, normally termed the vertical pivot and the horizontal pivot, and the headlamp adjustors 40 and 42 can be operated to effect movement of the reflector 24 in the vertical and horizontal planes.

The headlamp adjustors 40 and 42 are typically mounted to the housing 20 of the headlamp assembly 12 and have adjustor output shafts 44, 46 operatively connected to the movable reflector 24 by ball and socket type pivots, or the like, such that linear movement of the adjustor output shafts 44, 46 produces pivoting of the movable reflector in the vertical and horizontal planes. Specifically, each headlamp adjustor 40, 42 typically includes drive structure 48, 50 for receiving a tool, and typically the drive structure 48, 50 is precision geared to the adjustor output shaft 44, 46. The gearing provides that using the tool to rotate the drive structure 48, 50 causes linear translation of the adjustor output shaft 44, 46 and therefore adjustment of the position of the headlamp reflector 24.

Before an automobile is released to the consumer, the movable reflectors of the headlamp assemblies are adjusted to a desired position so that the headlamp beams are properly aimed in both the vertical and horizontal directions. To this end, headlamp adjustors are normally operated at the automobile assembly plant. Once proper vertical and horizontal aiming of the headlamps are attained and before the automobile is released to the consumer, vertical and horizontal indicators on each headlamp adjustor are manipulated to provide a visual indication that each movable reflector is in the desired, or "zero", position. The indicators either naturally transmit, or are adjusted in some manner in order to transmit, a visual indication of the zero position. Thereafter, if a movable reflector moves from its desired position, due, for example, to vibration, jarring, or the vehicle being in an accident, a mechanic can use the visual indication to determine that the movable reflector is no longer in its desired position. Then, the mechanic can operate the headlamp adjustors in order to return the horizontal and vertical indicators to the zero positions, which should properly re-align the reflector.

The Department of Transportation of the United States Government has set forth specific guidelines dealing with vehicle headlamp aiming and indicating mechanisms in both the horizontal and vertical directions. The guidelines set forth the degree of accuracy which is required of horizontal and vertical indicators. It is advantageous to provide a headlamp adjustor which is low cost, easy to use, easy to make, and which meets the government guidelines.

OBJECTS AND SUMMARY

Accordingly, it is an object of an embodiment of the present invention to provide a headlamp adjustor which is relatively low cost.

Another object of an embodiment of the present invention is to provide a headlamp adjustor which is easy to make and easy to use.

Still another object of an embodiment of the present invention is to provide a method for adjusting the position of a reflector of a headlamp assembly, where the method is relatively easy to perform.

Still yet another object of an embodiment of the present invention is to provide a method for making a headlamp adjustor, where the method is relatively easy to perform.

Briefly, and in accordance with one or more of the foregoing objects, an embodiment of the present invention provides a headlamp adjustor which includes an adjustor output shaft which is engageable with a reflector of a headlamp assembly. The adjustor output shaft extends from a housing, and a tandem spur gear/worm gear is engaged with a gear rack portion of the adjustor output shaft. Drive structure is engaged with the worm gear such that actuation of the drive structure causes at least a portion of the drive structure to thread into at least a portion of the worm gear, thereby causing the adjustor output shaft to translate relative to the housing and adjust the position of the headlamp reflector.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF EMBODIMENTS

Figure 1:
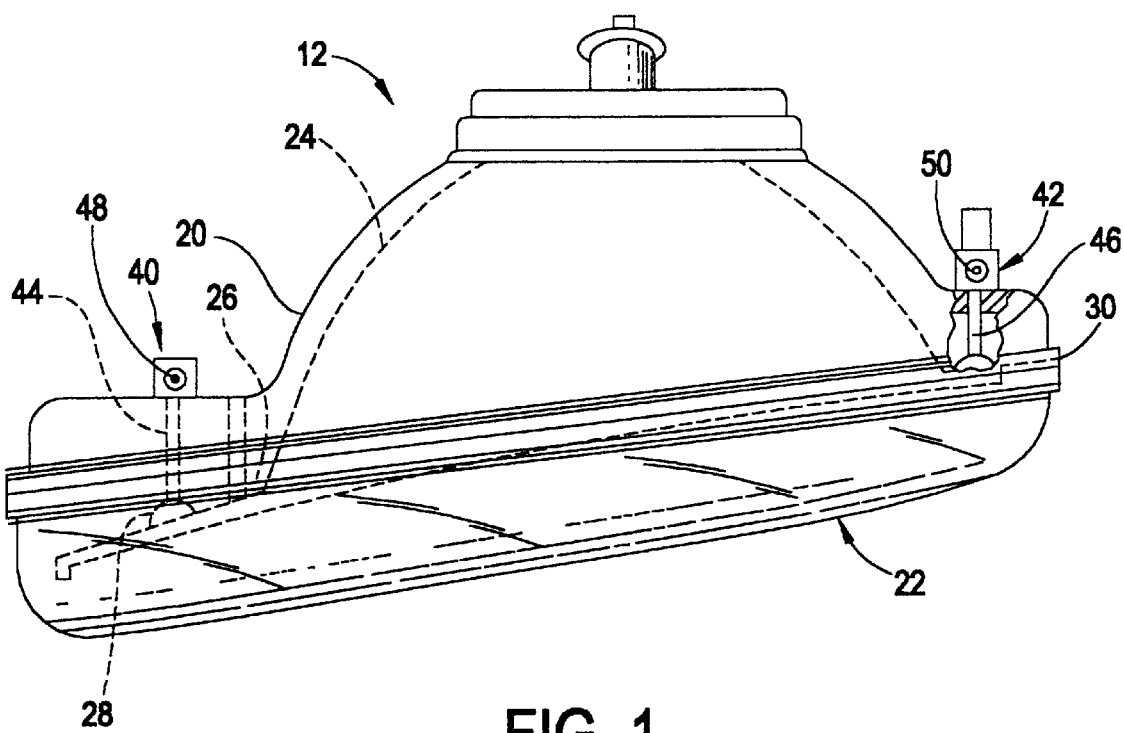
FIG. 1 is a plan view of a typical headlamp assembly.

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 2:
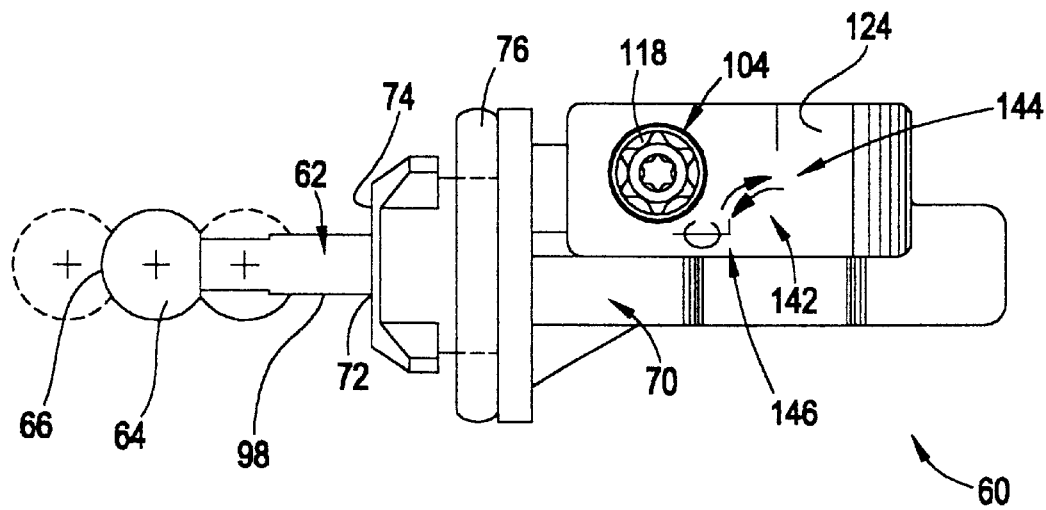
FIG. 2 is a top plan view of a headlamp adjustor which is in accordance with an embodiment of the present invention.

FIG. 2 illustrates a headlamp adjustor 60 which is in accordance with an embodiment of the present invention. The headlamp adjustor 60 includes an adjustor output shaft 62 which is configured for engagement with a reflector 24 of a headlamp assembly 12. Specifically, the adjustor output shaft 62 includes a ball portion 64 at one end 66 for engagement in a corresponding socket in a reflector 24 (see FIG. 1, and above description, for example). The headlamp adjustor 60 also includes a housing 70, and the adjustor output shaft 62 extends from a shaft hole 72 in the housing 70. The housing 70 is preferably mountable to the headlamp assembly 12 or to some other structure, such as a frame-like structure, which is generally proximate the headlamp assembly 12. Preferably, the headlamp adjustor 60 is "twist lock" mounted, such that the headlamp adjustor 60 is mountable to a headlamp assembly 12 by inserting an end 74 of the housing into an aperture in a housing 20 of the headlamp assembly 12 (see FIG. 1), and rotating the housing 70 of the headlamp adjustor 60 relative to the headlamp assembly 12 through a 120° (one third) rotation.

Figure 4:
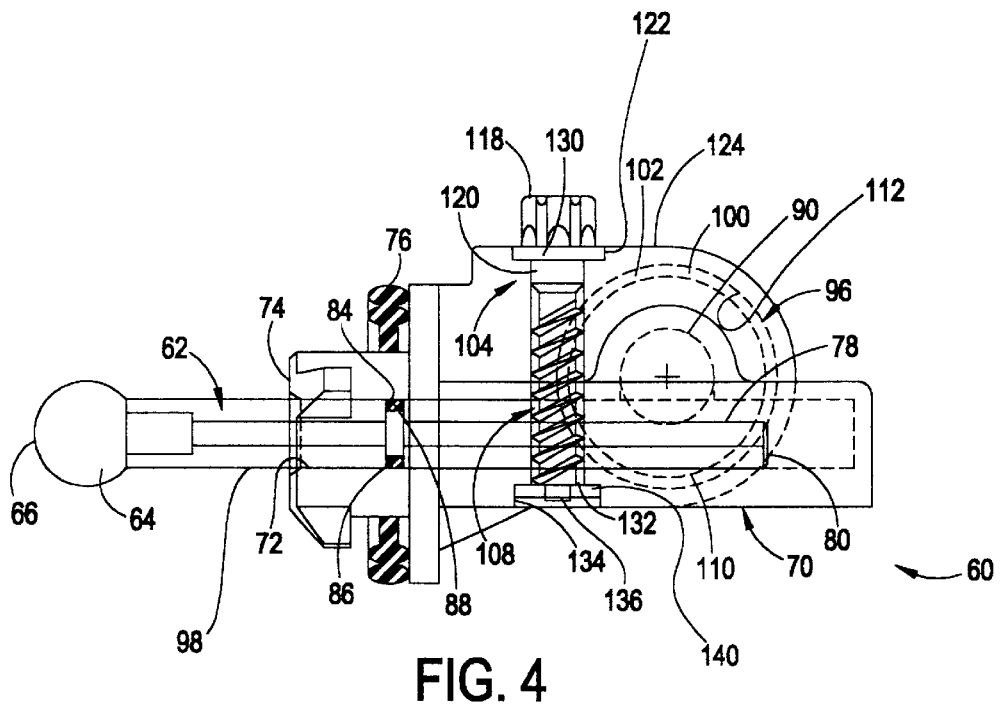
FIG. 4 is a side elevational view of the headlamp adjustor illustrated in FIG. 2.
Figures 5, 6:
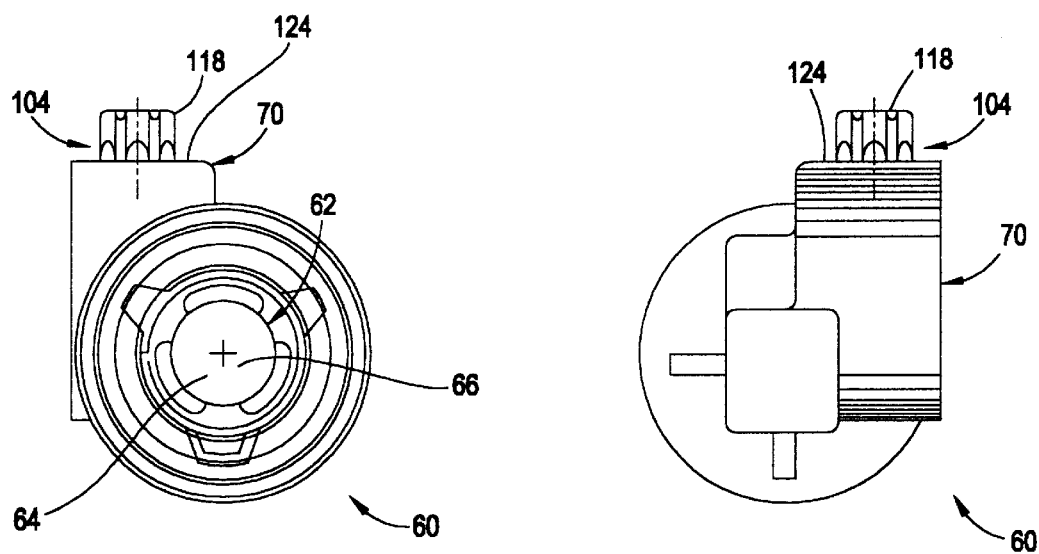
FIG. 5 is a front elevational view of the headlamp adjustor illustrated in FIG. 2.
FIG. 6 is a rear elevational view of the headlamp adjustor illustrated in FIG. 2.

As shown in FIGS. 2, 4 and 5, preferably a sealing member 76, such as an elastomeric sealing ring formed of R7744 Silicone, is disposed generally proximate the end 74 of the housing 70. Preferably, when the headlamp adjustor 60 is installed in the aperture in the housing 20 of the headlamp assembly 12, the sealing member 76 engages the housing 20 of the headlamp assembly 12 to provide an axial force between the housing 20 of the headlamp assembly 12 and the housing 70 of the headlamp adjustor 60 and generally reduces the amount of moisture which enters the headlamp assembly 12 through the aperture in the housing 20 of the headlamp assembly 12 and provides axial detent force for rotary lock. As will be described more fully later herein, once the headlamp adjustor 60 is properly mounted and engaged with the reflector 24, the headlamp adjustor 60 can be manipulated to cause the adjustor output shaft 62 to translate relative to the housing 70 and effect an adjustment to the position of the reflector 24.

Figure 7:
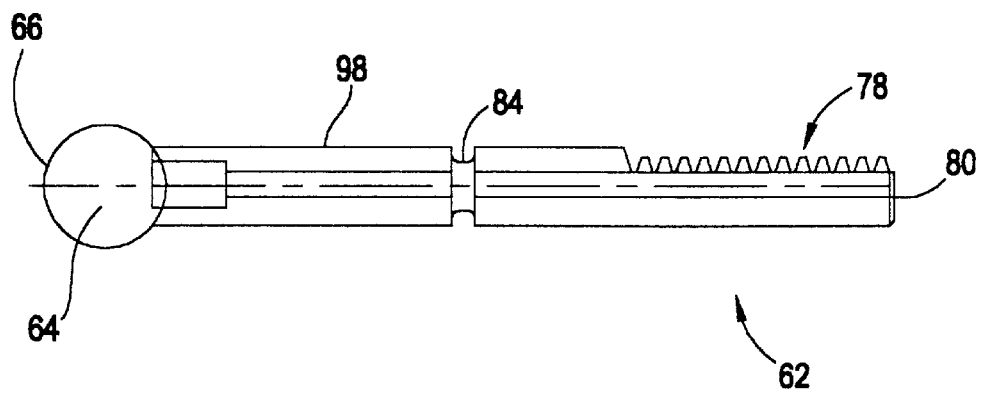
FIG. 7 is a side elevational view of an adjustor output shaft of the headlamp adjustor illustrated in FIGS. 2–6.

The housing 70 may be formed of, for example, Zytel 70G13HS1L, and the adjustor output shaft 62 may be formed of, for example, Delrin 570 or Zamac-3 (die casting) with a finish of Zinc/yellow dichromate. Regardless, preferably the adjustor output shaft 62 is easy to mold with plastic or die cast, and is relatively low cost. In FIG. 7, the adjustor output shaft 62 is shown isolated from the remainder of the headlamp adjustor 60. As shown, the adjustor output shaft 62 preferably includes a geared portion 78, and the geared portion 78 may be proximate an end 80 of the adjustor output shaft 62, where the end 80 is opposite the end 66 of the adjustor output shaft 62 at which the ball portion 64 is disposed. The geared portion 78 of the adjustor output shaft 62 may comprise, for example, a geared rack having thirteen teeth, a 48 diametral pitch and a 20° pressure angle.

As shown, preferably the adjustor output shaft 62 includes a recess 84 for receiving a sealing member 86 (specifically see FIG. 4), such as an o-ring, wherein the sealing member 86 tends to create a seal between the adjustor output shaft 62 and an internal wall 88 of the housing 70, thereby reducing the amount of moisture which enters the interior of the housing 70.

As shown in FIG. 4 as well as in FIG. 7, the geared portion 78 of the adjustor output shaft 62 engages a spur geared portion 90 of a worm gear 96. Preferably, the portion 98 of the adjustor output shaft 62 which extends between the ball portion 64 and the recess 84 has a generally round cross-section, and the engagement between the adjustor output shaft 62 and worm gear 96 prevents the adjustor output shaft 62 from rotating relative to the housing 70. The shaft hole 72 in the housing 70 also has a generally round shape, generally corresponding to the generally round cross-section of the portion 98 of the adjustor output shaft 62 which is between the geared portion 90 and the ball portion 64.

Figure 3:
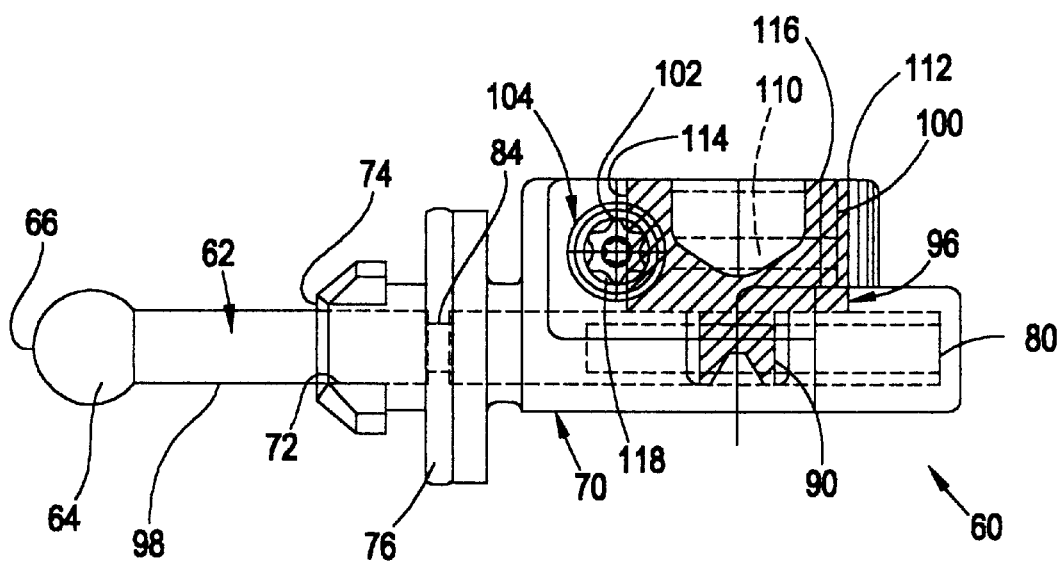
FIG. 3 is a top plan view similar to FIG. 2, but showing a worm gear member of the headlamp adjustor in cross-section.
Figure 8:
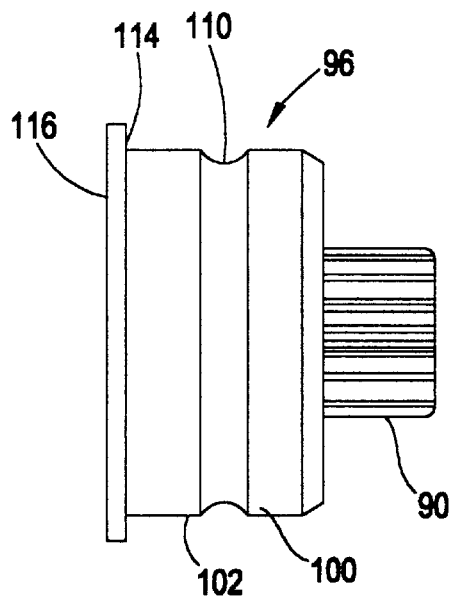
FIG. 8 is a side elevational view of a worm gear of the headlamp adjustor illustrated in FIGS. 2–6.

The worm gear 96 is also shown isolated in FIG. 8. The worm gear 96 may be formed of plastic. As shown in FIGS. 3, 4 and 8, the worm gear 96 not only includes a spur geared portion 90 which is configured for engagement with a spur geared portion 78 of the adjustor output shaft 62, but also includes another portion 100 which includes a peripheral edge 102 that is configured for engagement with drive structure, such as with a drive screw member 104 (FIGS. 3 and 4 illustrate the engagement between the worm gear 96 and the drive member 104).

The worm gear 96 and the drive member 104 are mounted in the engagement configuration much the same as standard worm gearing in which the drive member 104 acts as the worm and the worm gear 96 becomes such only when threads are formed by the worm 104 that would simulate worm gear teeth after repeated rotations of the worm.

Although the worm gear has no teeth initially, the disciplines of worm gearing apply such as; (refer to FIG. 8) the shape and circumference of the annular ring 110 must accommodate the pitch line of the worm 104 such that multiple turns of the worm resulting in more than a single rotation of the worm gear 96 will put the worm teeth in the same previously formed tooth. The radius of the ring accommodates the pitch radius of the worm 104.

The drive member 104 is initially driven tangentially against the worm gear, forming threads as a thread forming screw, without causing any worm gear rotation. The drive member 104 advances inward in the housing by means of the worm gear formed thread until a flange 130 of the screw member 104 (see FIGS. 4 and 9) bottoms on the housing. It is at this time that the rotary motion of the screw imparts rotary motion to the worm gear while forming worm gear teeth circumferentially in the annular channel 110.

Preferably, the worm gear 96 is disposed in a bore 112 in the housing 70, and a lip 114 is provided at an end 116 of the worm gear 96. It is preferred that the lip 114 at the end 116 of the worm gear 96 be configured such that a slight torturous path exists between the housing 70 and the lip 114, thereby providing a seal which generally reduces the amount of contaminants, such as dust, which enter between the lip 114 and the housing 70 and contact the inner workings of the headlamp adjustor 60.

Figure 9:
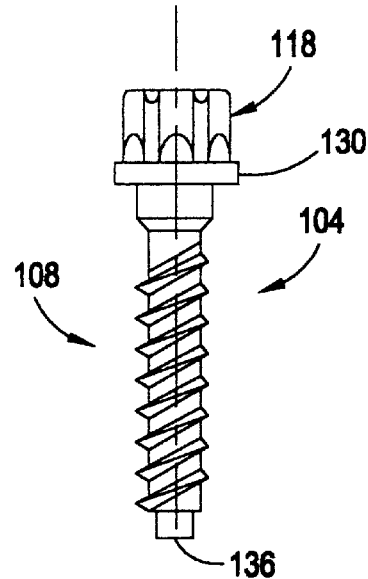
FIG. 9 is a side elevational view of a drive member of the headlamp adjustor illustrated in FIGS. 2–6.

The drive member 104 is shown isolated in FIG. 9. As shown, the drive member 104 preferably includes a head portion 118 and a threaded portion 108 which extends from the head portion 118 into an aperture 120 in the housing 70. Preferably, the drive member 104 is formed of metal, and has a finish of zinc plating with yellow dichromate, 0.002–0.003 inches thick. It is preferred that the threaded portion 108 comprise a standard K50 PT thread, and be generally consistent with that which is disclosed in U.S. Pat. No. 4,544,313, which is hereby incorporated herein by reference.

As shown in FIGS. 2–6, when the drive member 104 is engaged with the worm gear 96, the head portion 118 of the drive member 104 extends from the housing 70. Preferably, the head portion 118 is generally accessible from outside the housing 70, so that a tool can be engaged with the head portion 118 and used to rotate the head portion 118, thereby driving the drive member 104 and causing the worm gear 96 to rotate. Because the worm gear 96 is geared to the adjustor output shaft 62, rotation of the worm gear 96 causes the adjustor output shaft 62 to translate relative to the housing 70, thereby changing the position of the reflector 24 of the headlamp assembly 12.

As shown in FIG. 4, preferably a recess 122 is provided in an outer surface 124 of the housing 70, and the head portion 118 of the drive member 104 is generally received in the recess 122, with the threaded portion 108 of the drive member 104 extending into aperture 120 in the housing 70, engaged with the peripheral surface 102 of portion 100 of the worm gear 96. As shown, the flange 130 of the drive member 104 bottoms in the recess 122 to start the rotation and thread forming of worm gear 96.

As also shown in FIG. 4, preferably the outer surface 124 of the housing 70 provides another aperture 132 and recess 134, and an end 136 of the drive member 104 extends through the housing 70 and through the other aperture 132. Preferably, a retaining member 140 is engaged with the end 136 of the drive member 104. The end 136 of the drive member 104 may be peened to retain the retaining member 140 such that the drive member 104 can be rotated in both directions. The retaining member 140 may be, for example, a retaining washer formed of 1018 C.R. Steel, and may be finished with a Zinc plate with yellow dichromate.

Regardless, preferably the retaining member 140 provides that when a tool is used to rotate the drive member 104, the drive member 104 does not generally translate axially as the drive member 104 threads into the peripheral surface 102 of portion 100 of the worm gear 96. Instead, rotation of the drive member 104 causes the threaded portion 108 of the drive member 104 to thread into the peripheral surface 102 of portion 100 of the worm gear 96, causing the worm gear 96 to rotate in the housing 70 and the adjustor output shaft 62 to translate relative to the housing 70. Translation of the adjustor output shaft 62 causes the position of the reflector 24 of the headlamp assembly 12 to change.

As discussed above, the drive member 104 and portion 100 of the worm gear 96 are preferably configured such that when the drive member 104 is driven or rotated, the threaded portion 108 of the drive member 104 threads or cuts into the peripheral surface 102 of portion 100 of the worm gear 96. Hence, a worm gear profile is provided without having to tool portion 100 of the worm gear 96 to meet precision requirements. As a result, the headlamp adjustor 60 is less expensive to provide.

Preferably, the headlamp adjustor 60 illustrated in FIGS. 2–6 is generally easy to manufacture and is low cost. In the method of assembling the headlamp adjustor 60 illustrated in FIGS. 2–6, preferably each of the components are formed, and then the components are assembled. The method of fabricating and assembly and installation of the headlamp adjustor 60 will now be described. The worm gear 96 is inserted in the bore 112 in the housing 70, and then the adjustor output shaft 62 (with the sealing member 76 thereon, if provided) is placed into the shaft hole 72 in the end 74 of the housing 70 such that the geared portion 78 of the adjustor output shaft 62 engages the geared portion 90 of the worm gear 96. Then, the drive screw 104 is inserted into the aperture 120 in the housing 70 and driven into engagement with portion 100 of the worm gear 96 until the end 136 of the drive member 104 protrudes out the other aperture 132 in the housing 70. As the end 136 of the drive member 104 is driven to the other aperture 132 in the housing 70, portion 100 of the worm gear 96 generally acts as a portion of a hole in plastic until the head portion 118 and flange 130 reach the bottom of the aperture 120 (the surface 124 of the housing 70 adjacent the aperture 120). The initial engagement of the drive screw 104 will tap or otherwise cold form a mating thread or gear profile on portion 100 of the worm gear 96. Continued rotation of the drive member 104 causes the worm gear 96 to rotate as teeth are cut, tapped or otherwise formed into the peripheral surface 102 of portion 100 of the worm gear 96. Then, the retaining member 140 is engaged with the end 136 of the drive member 104 such that the drive member 104 cannot move generally axially relative to the housing 70. Therefore, the headlamp adjustor 60 is easy to assemble, and preferably requires no welding. Additionally, automation can be used to mass-assemble a plurality of such headlamp adjustors.

To install the assembled headlamp adjustor 60, the ball portion 64 of the adjustor output shaft 62 is engaged with a reflector 24 of a headlamp assembly 12, and the housing 70 of the headlamp adjustor 60 is secured to a housing 20 of the headlamp assembly 12 or to some other proximate surface, such as a frame-like surface (see FIG. 1 for example).

To manipulate the headlamp adjustor 60 to effect a change in the position of the reflector 24 of the headlamp assembly 12, one merely applies a tool to the head portion 118 of the drive member 104, and rotates the drive member 104. As shown in FIG. 2, preferably indicia 142 is provided on the housing 70 which renders the headlamp adjustor 60 "nonhanded". Such indicia 142 is disclosed in U.S. patent application Ser. No. 09/293,853, which is hereby incorporated herein by reference. The indicia 142, via arrows 144 and centerline indicator 146, indicates which direction to rotate the drive member 104 to effect movement of the reflector 24 in a direction which is either toward or away from a centerline of a vehicle in which the corresponding headlamp assembly 12 is installed. The indicia 142 effectively renders the headlamp adjustor 60 usable with headlamp assemblies of the vehicle which are both right and left of the centerline of the vehicle, and the indicia 142 is accurate with respect to rotation of the drive member 104 and resulting movement of the reflector regardless of whether the headlamp adjustor is engaged with a headlamp assembly which is to the right or left of the centerline of the vehicle.

Rotation of the drive member 104 causes the drive member 104 to cold form or cut a mating thread form into the peripheral surface 102 of portion 100 of the worm gear 96, thereby causing the worm gear 96 to rotate. Because the geared portion 78 of the adjustor output shaft 62 is engaged with the geared portion 90 of the worm gear 96, rotation of the worm gear 96 causes the adjustor output shaft 62 to translate relative to the housing 70 and adjust the position of the reflector 24 of the headlamp assembly 12. Preferably, the headlamp adjustor 60 is configured such that there is no backlash or axial play with regard to the adjustor output shaft 62. The headlamp adjustor 60 is generally reliable and has relatively good resolution. Preferably, the headlamp adjustor 60 is configured to provide that a full rotation of the drive member 104 causes the adjustor output shaft 62 to translate about 1 mm. Of course, other resolutions are possible.

Figure 10:
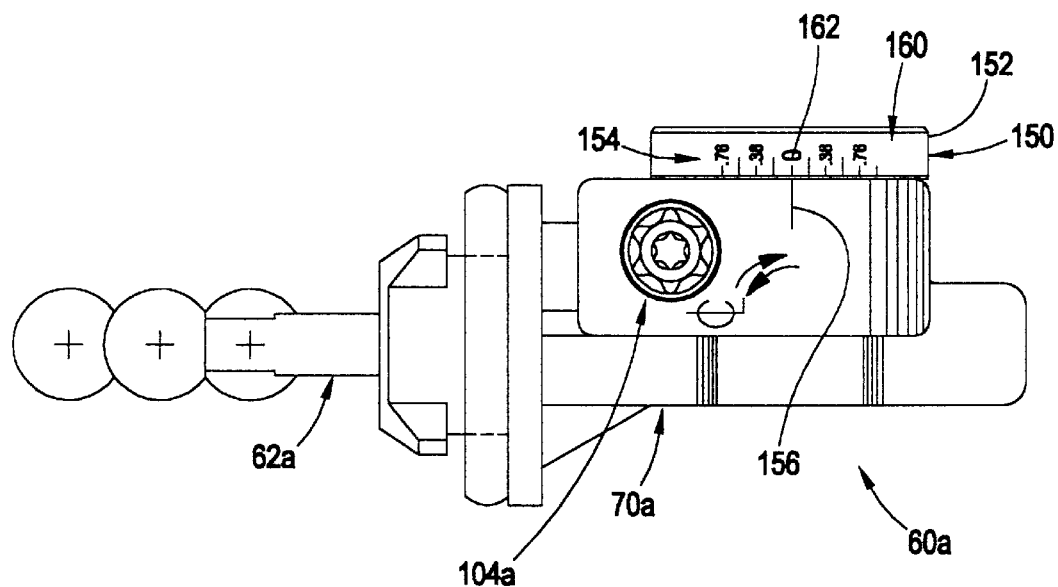
FIG. 10 is a top plan view of a headlamp adjustor which is in accordance with another embodiment of the present invention.
Figure 11:
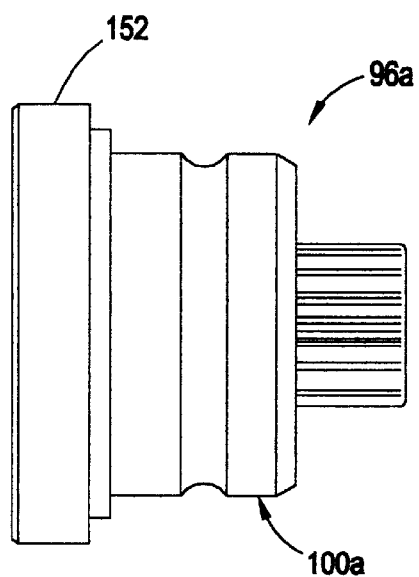
FIG. 11 is a side elevational view of a worm gear of the headlamp adjustor illustrated in FIG. 10.

FIG. 10 depicts a headlamp adjustor 60a which is in accordance with another embodiment of the present invention. The headlamp adjustor 60a is very much like that shown in FIGS. 2–6, and therefore similar reference numerals are used to identify similar parts and an alphabetic suffix "a" is used. The headlamp adjustor 60a shown in FIG. 10 differs from that shown in FIGS. 2–6 in that the headlamp adjustor 60a includes an indicator 150, such as a horizontal indicator which is provided on an extension 152 of portion 100a of the worm gear 96a. As shown in FIGS. 10 and 11, the worm gear 96a includes an extension portion 152 which extends from the housing 70a (see FIG. 10). Preferably, degree markings 154 are provided on the extension portion 152 as shown in FIG. 10, and a pointer 156 is provided on the housing 70a generally adjacent the degree markings 154 for indicating the position of the reflector 24 (see FIG. 1). Preferably, after the headlamp adjustor 60a has been assembled and installed, the drive member 104a is rotated in order to position the reflector 24 of the headlamp assembly 12 in the desired position. Then, the degree markings 154 are applied to the extension portion 152 of the worm gear 96a. Specifically, the degree markings 154 may be printed on a sticker 160, and the sticker 160 may be attached to the extension portion 152 of the worm gear 96a such that a "zero" marking 162 generally aligns with the pointer 156 on the housing 70a (as shown in FIG. 10). Ideally, any subsequent, undesired movement of the reflector 24 by rotation of the drive member 104a subsequent to calibration will cause the "zero" marking 162 to mis-align from the pointer 156 on the housing 70a and indicate that the reflector 24 has become mis-aligned from the desired position. Preferably, the sticker 160 which contains the degree markings 154 is tamper evident. Tamper evidence would be that the label delaminates upon removal, making the printed legend illegible.

Due the similarity between the two headlamp adjustors 60 and 60a, headlamp adjustor 60a provides generally the same features as does headlamp adjustor 60, but also provides the indication feature as well as the tamper evident feature, if desired.

Figure 12:
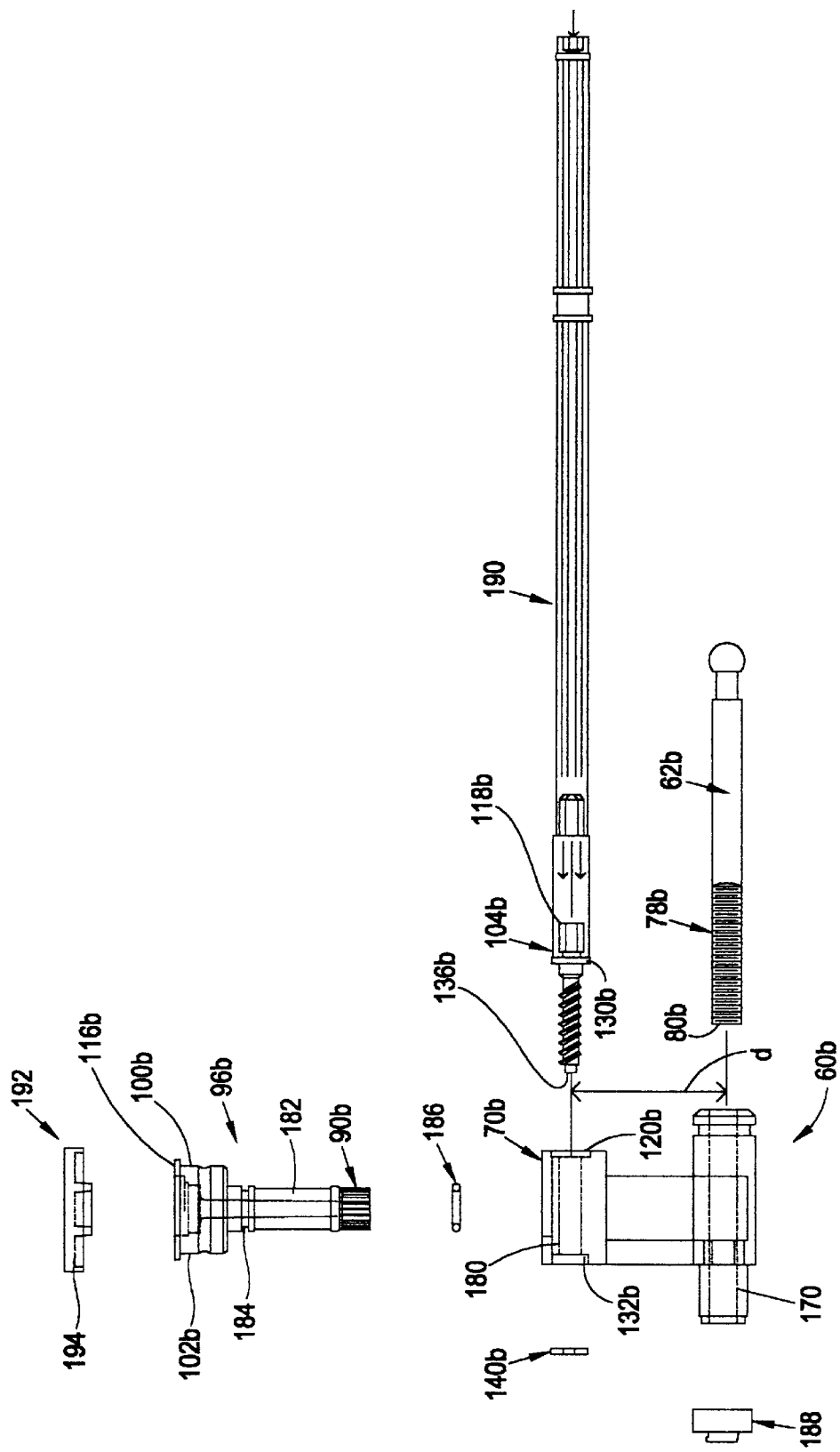
FIG. 12 is an exploded view of a headlamp adjustor which is in accordance with yet another embodiment of the present invention.

FIG. 12 illustrates, in exploded view, a headlamp adjustor 60b which is in accordance with yet another embodiment of the present invention. Because the headlamp adjustor 60b is similar to those which have described already, similar reference numerals are used to identify similar parts, and the alphabetic suffix "b" is used. Like the headlamp adjustors 60 and 60a already described, the headlamp adjustor 60b depicted in FIG. 12 also includes an adjustor output shaft 62b, a housing 70b, a drive member 104b, a retaining member 140b and a worm gear 96b. The headlamp adjustor 60b is different than the headlamp adjustors 60 and 60a already described in that the drive member 104b is generally parallel to (as opposed to being generally perpendicular to) the adjustor output shaft 62b, and meeting a specific distance requirement "d" between drive member and output shaft. To this end, the housing 70b is shaped differently than the housings 70 and 70a of the headlamp adjustors 60 and 60a depicted in FIGS. 2–6 and 10, respectively. As shown, the housing 70b has two generally parallel bores 170 and 180—one bore 170 for receiving the adjustor output shaft 62b (and geared portion 90b of the worm gear 96b) and another bore 180 for receiving the drive member 104b (and portion 100b of the worm gear 96b). The worm gear 96b includes an elongated portion 182 which is disposed between the geared portion 90b and portion 100b which is engaged with the drive member 104b. When the worm gear 96b is properly installed in the housing 70b, the geared portion 90b of the worm gear 96b is engaged with the geared portion 78b of the adjustor output shaft 62b, and portion l0Ob is engaged with the drive member 104b. Preferably, the worm gear 96b includes a recess 184 for receiving a sealing member 186, and the sealing member 186 seals against an interior wall of the housing 70b so as to work in conjunction with a micro-filter 188 that provides controlled venting of the lamp housing 20. As shown, a vent 188 is preferably provided on the housing 70b, generally proximate the end 80b of the adjustor output shaft 62b for sealing bore 170. Controlled venting as addressed in U.S. Pat. No. 5,775,794, hereby incorporated herein by reference, is an alternative to hermetic sealing of the lamp housing 20, by the output shaft seal 86 seen in FIG. 4. FIG. 12 also illustrates a shaft extension which is permanently attached to the head portion 118b of the drive member 104b to rotate the drive member 104b, thereby driving the worm gear 96b and causing the adjustor output shaft 62b to translate relative to the housing 70b and change the position of the reflector 24.

As shown in FIG. 12, preferably the headlamp adjustor 60b includes a cap 192 which attaches to the end 11 6b of the worm gear 96b. Preferably, the cap 192 provides a surface 194 on which are degree markings (see FIG. 10). To this end, a sticker 160 may be applied to the surface 194 of the cap 192, wherein the sticker 160 is described hereinabove in connection with the headlamp adjustor 60a illustrated in FIG. 10.

Preferably, the headlamp adjustor 60b illustrated in FIG. 12 is generally easy to manufacture and is low cost. In making the headlamp adjustor 60b illustrated in FIG. 12, preferably each of the components are formed, and then the components are assembled. Assembly and installation of the headlamp adjustor 60b will now be described. Preferably, the cap 192 is assembled to the worm gear 96b by a snap fit or welding, and the vent 188 is welded to the housing 70b.

The sealing member (if provided) 186 is engaged with the worm gear 96b, and the worm gear 96b is inserted in the housing 70b. Then, the adjustor output shaft 62b is inserted into bore 170 such that the geared portion 78b of the adjustor output shaft 62b engages the geared portion 90b of the worm gear 96b. Then, the drive member 104b with attached extension 190 is inserted into the bore 180 in the housing 70b and driven into engagement with portion 100b of the worm gear 96b until the end 136b of the drive member 104b protrudes out aperture 132b in the housing. As the end 136b of the drive member 104b is driven to the aperture 132b, portion 100b of the worm gear 96b generally acts as a portion of a hole in plastic until the head portion 118b and flange 130b reach the bottom of the aperture 120b (the surface of the housing 70b adjacent the aperture 120b). Continued rotation of the drive member 104b causes the worm gear 96b to rotate as teeth are cut into the peripheral surface 102b of portion 100b of the worm gear 96b. Then, the retaining member 140b is engaged with the end 136b of the drive member 104b such that the drive member 104b does not move generally axially relative to the housing 70b when the drive member 104b is rotated. Like the headlamp adjustors 60 and 60a previously described, the headlamp adjustor 60b is easy to assemble. Additionally, automation can be used to mass-assemble a plurality of such headlamp adjustors.

Figure 13:
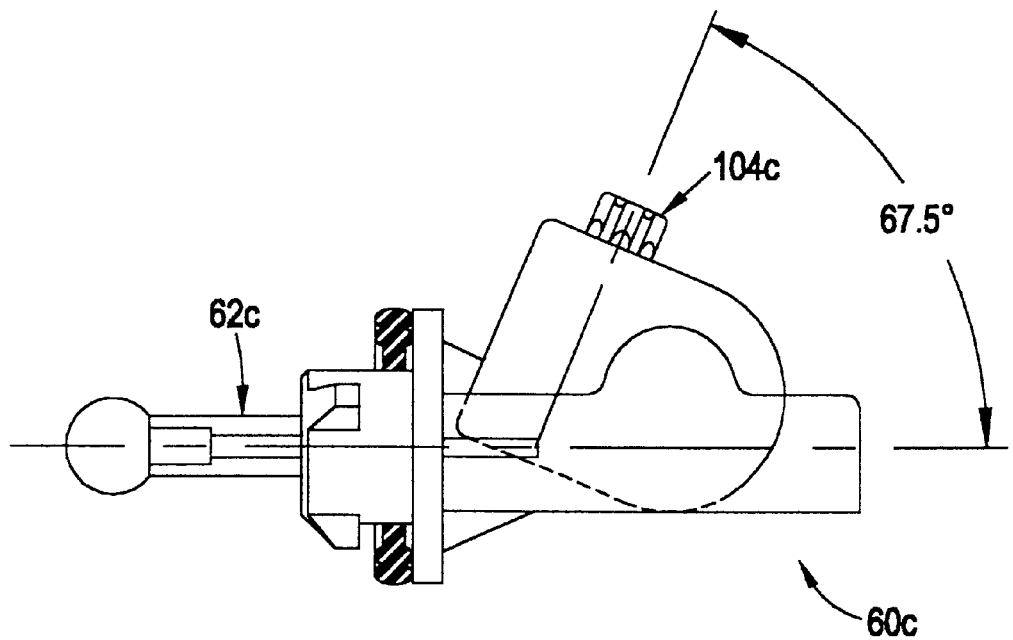
FIGS. 13 and 14 are side elevational views of headlamp adjustors which are in accordance with still yet other embodiments of the present invention.
Figure 14:
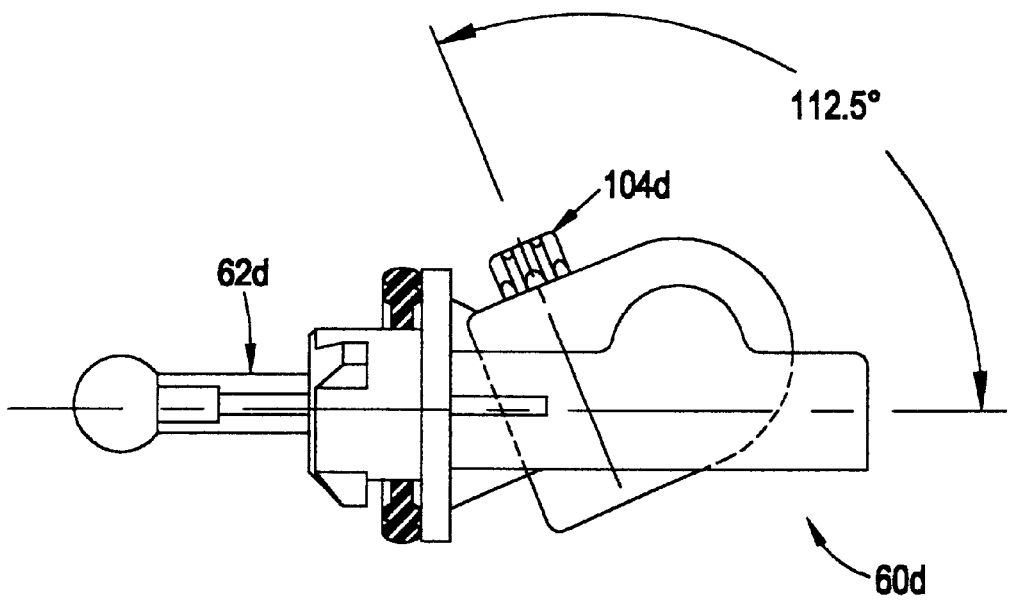

FIGS. 13 and 14 illustrate two more headlamp adjustors 60c and 60d, each of which is in accordance with another embodiment of the present invention. Preferably, each includes generally the same components as the headlamp adjustor which is shown in FIGS. 2–6, but provides that the drive member 104c, 104d is angled relative to the adjustor output shaft 62c, 62d. Specifically, FIG. 13 depicts a headlamp adjustor where the drive member 104c is provided at a 67.5° angle relative to the adjustor output shaft 62c, and FIG. 14 depicts a headlamp adjustor 60d where the drive member 104d is provided at a 112.5° angle relative to the adjustor output shaft 62d. Of course, other angles are possible.

While embodiments of the present invention are shown and described, it is envisioned that those skilled in the art may devise various modifications without departing from the spirit and scope of the foregoing description.

What is claimed is:

1. A headlamp adjustor configured for engagement with a reflector of a headlamp assembly, said headlamp adjustor comprising an adjustor output shaft which is engageable with the reflector of the headlamp assembly; a housing, said adjustor output shaft extending from said housing; a gear member disposed in said housing and having a spur geared portion, said adjustor output shaft including a gear rack portion, said spur geared portion of said gear member engaged with said gear rack portion of the adjustor output shaft; and drive structure engaged with said gear member such that actuation of the drive structure causes at least a portion of the drive structure to thread into at least a portion of the gear member, thereby forming threads on said gear member.

2. The headlamp adjustor as recited in claim 1, said headlamp adjustor configured such that a worm gear profile is cut into said gear member upon actuation of said drive structure.

3. The headlamp adjustor as recited in claim 1, said gear member including a peripheral edge, said drive structure engaged with said peripheral edge, said drive structure forming threads in said peripheral edge upon said drive structure being actuated.

4. The headlamp adjustor as recited in claim 3, said drive structure being generally tangential to said peripheral edge of said gear member.

5. The headlamp adjustor as recited in claim 3, said peripheral edge including an annular channel, said drive structure engaging said annular channel.

6. The headlamp adjustor as recited in claim 1, wherein at least a portion of said gear member is comprised of plastic.

7. The headlamp adjustor as recited in claim 1, said drive structure including a threaded portion and a flange, said threaded portion disposed in said housing and said flange external to said housing, wherein initial actuation of said drive structure causes said threaded portion of said drive structure to thread into said gear member, thereby forming threads on said gear member while said gear member does not substantially rotate in said housing, wherein actuation of said drive structure causes said flange to contact said housing whereafter further actuation of said drive structure causes said gear member to rotate thereby causing said adjustor output shaft to translate relative to said housing and adjust the position of the headlamp reflector.

8. The headlamp adjustor as recited in claim 7, further comprising a retaining member engaged with said drive structure, said drive structure including a first end and a second end which is generally opposite said first end, said first end configured to be engaged with a tool for driving said drive structure, said retaining member engaged with said second end of said drive structure.

9. The headlamp adjustor as recited in claim 1, further comprising indicia on said housing, said indicia indicating which direction to rotate said drive structure to effect movement of the reflector in a direction which is either toward or away from a centerline of a vehicle.

10. The headlamp adjustor as recited in claim 1, further comprising means on said gear member and said housing for indicating the position of the reflector.

11. The headlamp adjustor as recited in claim 10, said means for indicating the position of the reflector comprising degree markings on said gear member and a pointer on said housing.

12. The headlamp adjustor as recited in claim 10, said means for indicating the position of the reflector comprising a sticker affixed to an extension of said gear member, said sticker having degree markings thereon.

13. The headlamp adjustor as recited in claim 1, said drive structure having a longitudinal axis and said adjuster output shaft having a longitudinal axis, said longitudinal axis of said drive structure being generally parallel to said longitudinal axis of said adjustor output shaft.

14. The headlamp adjustor as recited in claim 13, said gear member having a longitudinal axis, said longitudinal axis of said gear member being generally perpendicular to said longitudinal axis of said adjustor output shaft and to said longitudinal axis of said drive structure.

15. A method of assembling a headlamp adjustor configured for engagement with a reflector of a headlamp assembly, said method comprising: providing a housing; providing a gear member having a spur geared portion; providing a drive structure having a threaded portion; providing an adjustor output shaft which is engageable with the reflector of the headlamp assembly, said adjustor output shaft including a gear rack portion; inserting the gear member in the housing; inserting the adjustor output shaft in the housing and engaging the gear rack portion of the adjustor output shaft with the spur geared portion of the gear member; inserting the drive structure in the housing and contacting the threaded portion of the drive structure with the gear member; and rotating said drive structure to form threads on the gear member.

16. The method as recited in claim 15, further comprising using the drive structure to cut a worm gear profile into said gear member.

17. The method as recited in claim 15, further comprising using the drive structure to cut a worm gear profile into a peripheral edge of said gear member.

18. The method as recited in claim 15, wherein said drive structure includes a threaded portion and a flange; said method further comprising rotating the drive structure to cause the threaded portion of the drive structure to thread into the gear member, thereby forming threads on the gear member while the gear member does not substantially rotate in the housing; further rotating the drive structure until the flange contacts the housing; and further rotating the drive structure to cause the gear member to rotate in the housing.

19. The method as recited in claim 15, further comprising providing a retaining member, said drive structure including a first end and a second end which is generally opposite said first end, said first end configured to be engaged with a tool for driving said drive structure, said method further comprising engaging said retaining member with said second end of said drive structure.

20. The method as recited in claim 15, further comprising affixing a sticker to an extension of said gear member, said sticker having degree markings thereon.

\* \* \* \* \*